(12) United States Patent
Fukano et al.

(10) Patent No.: US 7,240,925 B2
(45) Date of Patent: Jul. 10, 2007

(54) TUBE JOINT

(75) Inventors: Yoshihiro Fukano, Moriya (JP); Tadashi Uchino, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/706,945

(22) Filed: Nov. 14, 2003

(65) Prior Publication Data

US 2004/0100097 A1    May 27, 2004

(30) Foreign Application Priority Data

Nov. 25, 2002    (JP)    ............................. 2002-341197

(51) Int. Cl.
*F16L 33/00*    (2006.01)

(52) U.S. Cl. .................. 285/247; 285/243; 285/322

(58) Field of Classification Search ............... 285/243, 285/245, 247, 251, 257, 386, 324, 382.7, 285/322, 354, 334.5, 901
See application file for complete search history.

(56) References Cited

U.S. PATENT DOCUMENTS

| | | | | |
|---|---|---|---|---|
| 2,032,720 A | * | 3/1936 | Karl ........................ | 285/334.5 |
| 2,439,351 A | * | 4/1948 | Thayer et al. .............. | 285/247 |
| 2,444,622 A | * | 7/1948 | Wolfram ................... | 285/334.5 |
| 3,214,200 A | | 10/1965 | Carlson et al. | |
| 3,294,426 A | | 12/1966 | Lyon | |
| 3,633,944 A | * | 1/1972 | Hamburg ................... | 285/354 |
| 3,684,322 A | | 8/1972 | Kotsakis | |
| 4,162,802 A | | 7/1979 | Cox | |
| 5,072,072 A | * | 12/1991 | Bawa et al. ................ | 285/243 |
| 5,154,453 A | * | 10/1992 | Nishio ...................... | 285/354 |
| 5,797,633 A | * | 8/1998 | Katzer et al. .............. | 285/243 |
| 5,951,060 A | | 9/1999 | Fukano et al. | |
| 6,022,053 A | * | 2/2000 | Hukuda ..................... | 285/354 |
| 6,142,832 A | * | 11/2000 | Kubota ..................... | 439/638 |
| 6,170,887 B1 | | 1/2001 | Salomon-Bahls et al. | |
| 6,193,239 B1 | | 2/2001 | Fukano et al. | |
| 6,283,443 B1 | | 9/2001 | Taneya | |
| 6,334,632 B1 | | 1/2002 | Nishio et al. | |
| 6,467,816 B1 | | 10/2002 | Huang | |
| 6,554,323 B1 | | 4/2003 | Salomon-Bahls et al. | |

FOREIGN PATENT DOCUMENTS

| | | |
|---|---|---|
| CN | 1266964 | 9/2000 |
| DE | 11 84 160 B | 12/1964 |
| DE | 73 36 713 | 1/1974 |
| DE | 87 00415.1 | 4/1987 |
| DE | 37 37 062 | 12/1989 |
| DE | 41 41 309 | 9/1992 |
| DE | 195 28 195 | 2/1997 |
| DE | 100 35 791 A | 3/2001 |
| EP | 0 945 664 A | 9/1999 |

(Continued)

*Primary Examiner*—Aaron Dunwoody
(74) *Attorney, Agent, or Firm*—Paul A. Guss

(57) ABSTRACT

A tube joint comprises a nut member which connects a tube to a joint body, collet sections which fasten the tube by fastening pawls for being pressed radially inwardly by a pressing section of the nut member to bite into an outer circumferential surface of a diametrally expanded section of the tube, and an annular projection which abuts against an annular step of the joint body and which regulates a screwing amount of the nut member on the joint body.

9 Claims, 9 Drawing Sheets

FOREIGN PATENT DOCUMENTS

| | | |
|---|---|---|
| GB | 443 040 A | 2/1936 |
| GB | 1 217 739 A | 12/1970 |
| JP | 51-38122 | 3/1976 |
| JP | 62-110093 | 5/1987 |
| JP | 04-175595 | 6/1992 |
| JP | 3032308 | 10/1996 |
| JP | 3041899 | 7/1997 |
| JP | 9-257172 | 9/1997 |
| JP | 10-288286 | 10/1998 |
| JP | 10-299964 | 11/1998 |
| JP | 11-182751 | 7/1999 |
| JP | 2001-193876 | 7/2001 |

* cited by examiner

TUBE JOINT

BACKGROUND OF THE INVENTION

1. Field of the Invention

The present invention relates to a tube joint which makes it possible to connect a tube member to a fluid-operated apparatus in a liquid-tight manner or in an airtight manner.

2. Description of the Related Art

When a semiconductor chip is produced, a tube joint made of resin such as fluororesin has been hitherto used in a production line or the like in which a pure water washing solution or other chemical solutions or the like are used, in view of the cleanness, the corrosion resistance, and the chemical resistance.

Such a tube joint is disclosed, for example, in Japanese Laid-Open Patent Publication No. 11-182751. That is, as shown in FIG. 9, a diametrally expanded end 2 of a tube 1 is fitted into a ring groove 6 of a main joint body 5 penetratingly through a plug hole 4 of a nut member 3. A female screw section 8 on the inner circumferential surface of the nut member 3 is screwed with a male screw section 7 on the outer circumferential surface of the main joint body 5. Accordingly, the tube 1 is supported thereby.

However, in the conventional tube joint disclosed in Japanese Laid-Open Patent Publication No. 11-182751, the diametrally expanded end 2 of the tube 1 is merely fitted into the ring groove 6 of the main joint body 5. Therefore, for example, when the force to pull out the tube 1 is applied to the tube 1 in the direction (direction of the arrow E shown in FIG. 9) opposite to the fitting direction especially in a high temperature atmosphere, the tube 1 tends to come out from the main joint body 5.

In the conventional tube joint disclosed in Japanese Laid-Open Patent Publication No. 11-182751, no means is provided for securing an appropriate screwing amount when the female screw section 8 of the nut member 3 is screwed into the male screw section 7 of the main joint body 5. Further, if the screwing amount is excessive, the diametrally expanded portion of the tube 1 is pressed toward the center by a circumferential edge 3a of the plug hole 4 of the nut member 5. Therefore, excessive load may be applied to the diametrally expanded portion of the tube 1.

SUMMARY OF THE INVENTION

A general object of the present invention is to provide a tube joint which makes it possible to reliably prevent a tube member from being disengaged from a joint body.

A principal object of the present invention is to provide a tube joint which makes it possible to secure an appropriate screwing amount of a nut member on a joint body.

According to the present invention, a nut member is screwed onto a joint body along with a second screw section which is screwed with a first screw section in a state in which a tube member is inserted into the joint body. When the tightening is effected so that the screwing amount of the nut member is gradually increased on the joint body, the screwing amount is regulated by a regulating element which is provided on an end surface of the nut member, and thus an appropriate screwing amount is established.

According to the present invention, the outer circumferential surface of the tube member is fastened by the fastening mechanism which is pressed radially inwardly by the inner wall surface of the nut member. Therefore, even when any force is exerted in a pull-out direction of the tube member, the tube member is prevented from disengagement from the joint body.

In this arrangement, for example, it is preferable that the fastening mechanism includes a plurality of collet sections which are elastically deformable toward an outer circumference of the tube member inserted into the joint body and which are circumferentially segmented to surround the outer circumferential surface of the tube member, and fastening pawls which are formed on the collet sections and which bite into the outer circumferential surface of the tube member.

That is, a pressing section is provided on the inner wall surface of the nut member, the pressing section comprises a tapered surface having gradually decreasing inner diameters from the second screw section, and the collet sections are pressed by the pressing section radially inwardly when the nut member is screwed. Therefore, the fastening pawls formed on the collet sections reliably bite into the outer circumferential surface of the tube member when the pressing section of the nut member presses the collet sections.

It is preferable that the regulating element has, for example, an annular projection which protrudes by a predetermined length from the end surface of the nut member toward the joint body, and the screwing amount of the nut member is regulated by abutment of the annular projection against an abutment surface of the joint body.

In this arrangement, it is preferable that the end surface of the nut member is formed with an annular recess for receiving the annular projection deformed when the nut member is further screwed from where the annular projection abuts against the abutment surface of the joint body.

The annular projection is plastically deformable so that the nut member is capable of being further screwed from where the annular projection abuts against the abutment surface of the joint body. Accordingly, even when the tightening torque of the nut member for the joint body is decreased, it is possible to retain the tightening torque to be constant.

Further, the nut member is formed with a plug hole for inserting the tube member thereinto, and an edge section is provided on the inner wall surface of the nut member in the vicinity of an end of the plug hole, the edge section bites into the outer circumferential surface of the tube member. Accordingly, the tube member is fastened more reliably.

It is preferable that a tapered surface is formed at the end of the joint body, the tapered surface is diametrally expanded gradually in a direction in which the tube member is inserted, and a projection is formed circumferentially on the tapered surface, corresponding to the edge section of the nut member. It is preferable that a projection is formed circumferentially corresponding to the fastening pawls formed on the collet sections, the projection is provided on an outer circumferential surface at an end of the joint body. When each of the projections is formed at the portion of the nut member opposed to the edge section or the portion opposed to the fastening pawl of the collet section, the surface pressure is increased, and it is possible to improve the sealing effect.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
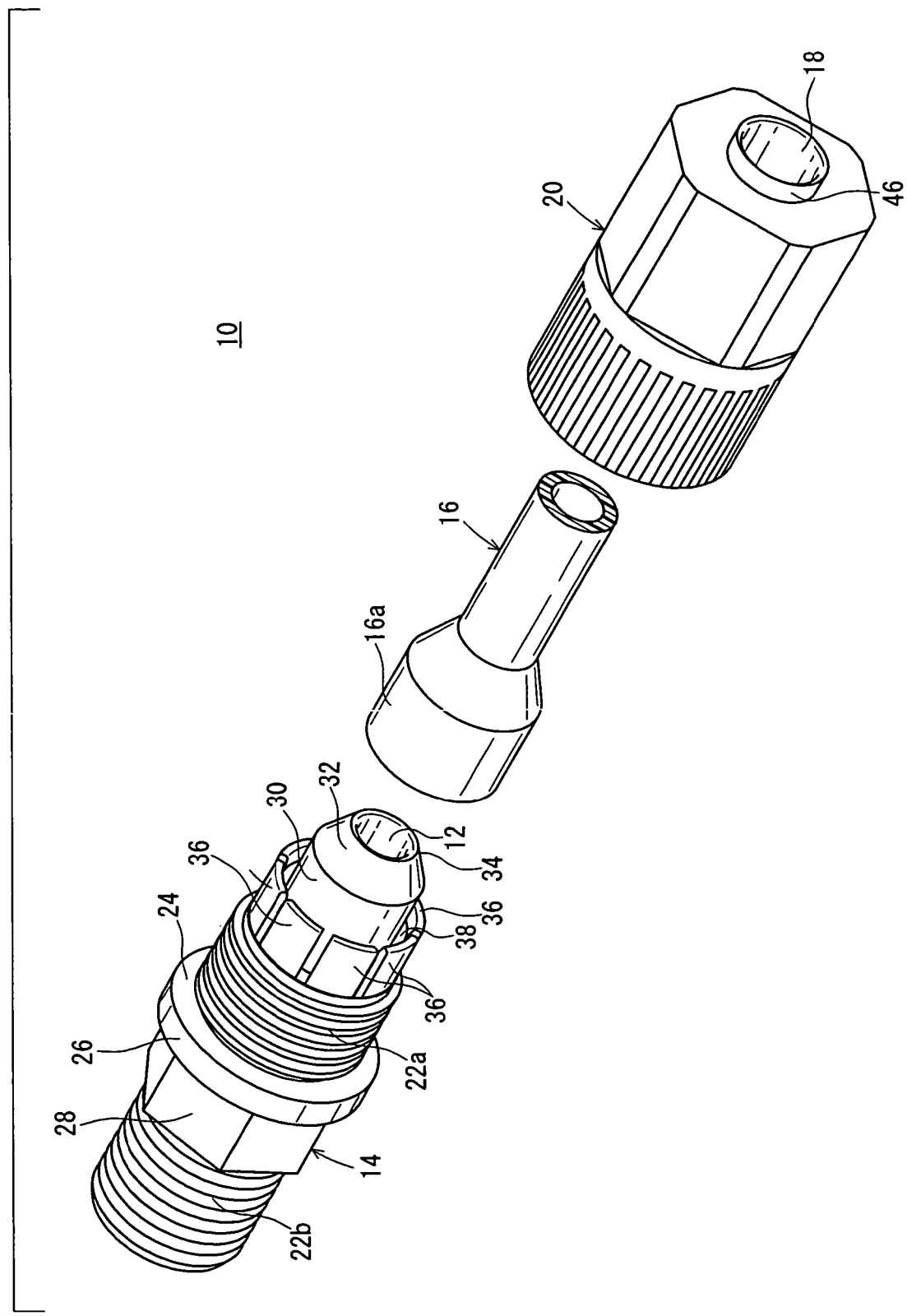
FIG. 1 is, with partial cross section, an exploded perspective view illustrating a tube joint according to an embodiment of the present invention.

With reference to FIG. 1, reference numeral 10 indicates a tube joint according to an embodiment of the present invention.

The tube joint 10 comprises a substantially cylindrical joint body 14 which has a through-hole 12 as a fluid passage formed linearly in the axial direction, and a nut member 20 which has a plug hole 18 having a circular cross section for inserting a tube (tube member) 16 thereinto and which is fitted to the joint body 14 to hold the tube 16 thereby. Each of the joint body 14 and the nut member 20 is formed of a resin material.

Figure 2:
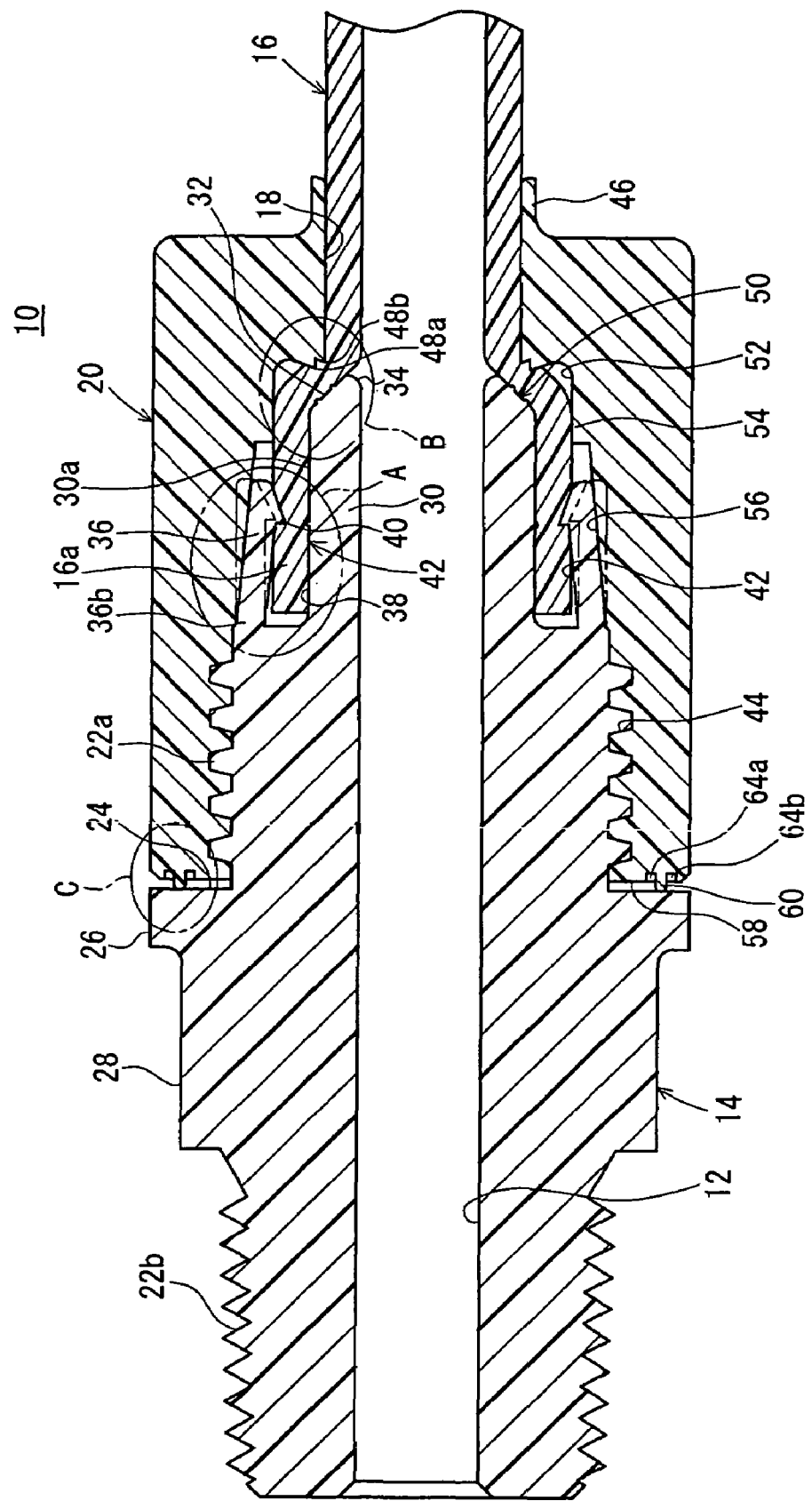
FIG. 2 is a longitudinal sectional view taken in the axial direction illustrating the tube joint shown in FIG. 1.

As shown in FIG. 2, the joint body 14 is provided with a first male screw section (first screw section) 22a which has a screw thread having a substantially trapezoidal cross section formed on the outer circumferential surface in the vicinity of one end, and a second male screw section 22b which has a screw thread having a sawteeth-shaped cross section formed on the outer circumferential surface at the other end. An annular ridge 26 is formed at the end of the first male screw section 22a disposed closely to the second male screw section 22b. The annular ridge 26 is expanded radially outwardly from an annular step 24 having a circumscribing flat surface. An angular section 28 having a hexagonal cross section is formed between the annular ridge 26 and the second male screw section 22b to grasp the joint body 14 by using an unillustrated tool such as a wrench.

A cylindrical section 30 is formed at one end of the joint body 14. The cylindrical section 30 has a through-hole 12 extending in the axial direction, and a diametrally expanded section 16a of the tube 16 is attached to the cylindrical section 30. A tapered surface 32 is provided at the end of the cylindrical section 30 (see FIG. 4), and has diameters gradually increasing in the direction in which the tube 16 is attached to. A chamfered section 34 is formed at the boundary between the tapered surface 32 and the through-hole 12, and is chamfered to have a predetermined radius of curvature.

Figure 4:
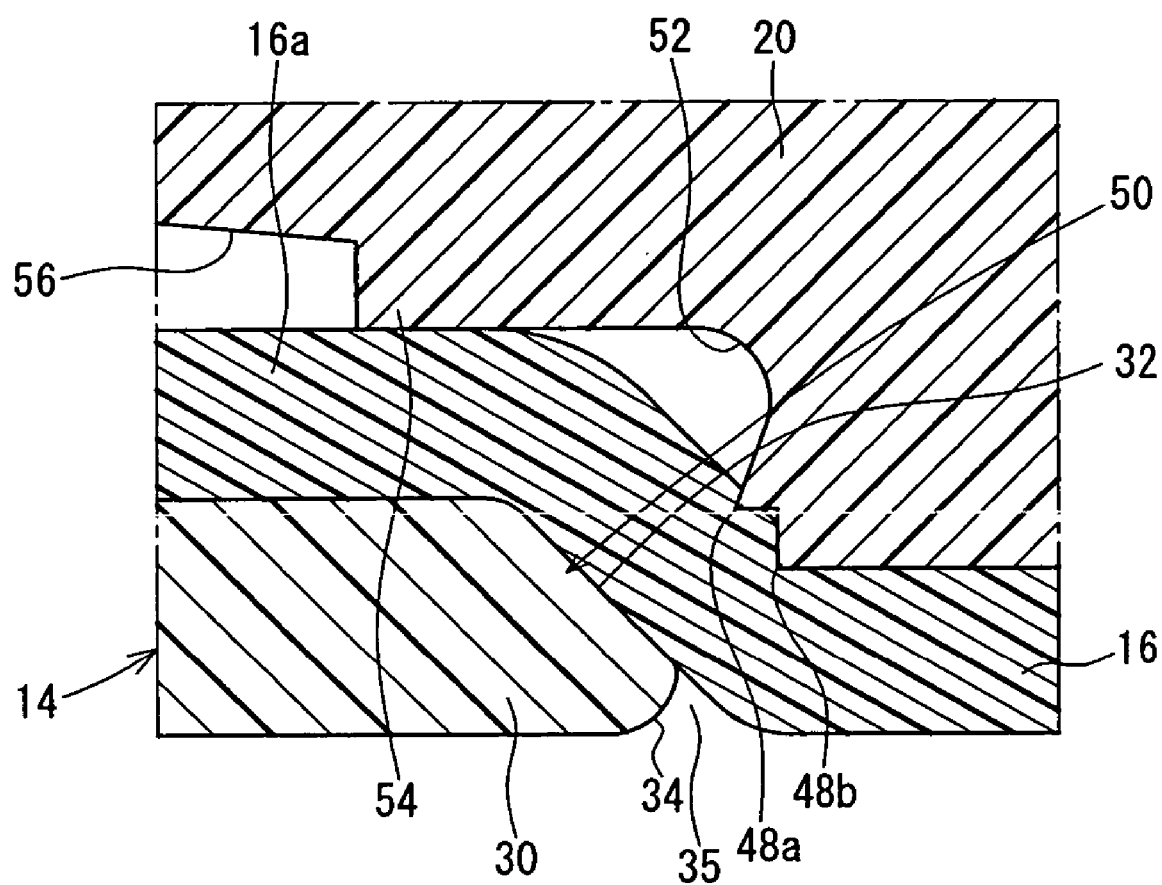
FIG. 4 is a magnified longitudinal sectional view illustrating a portion B of the tube joint shown in FIG. 2.

As shown in FIG. 4, the chamfered section 34 has a curved cross section having the predetermined radius of curvature. Accordingly, it is possible to minimize the liquid pool (or accumulation) of the pressure fluid in the through-hole 12.

Figure 9:
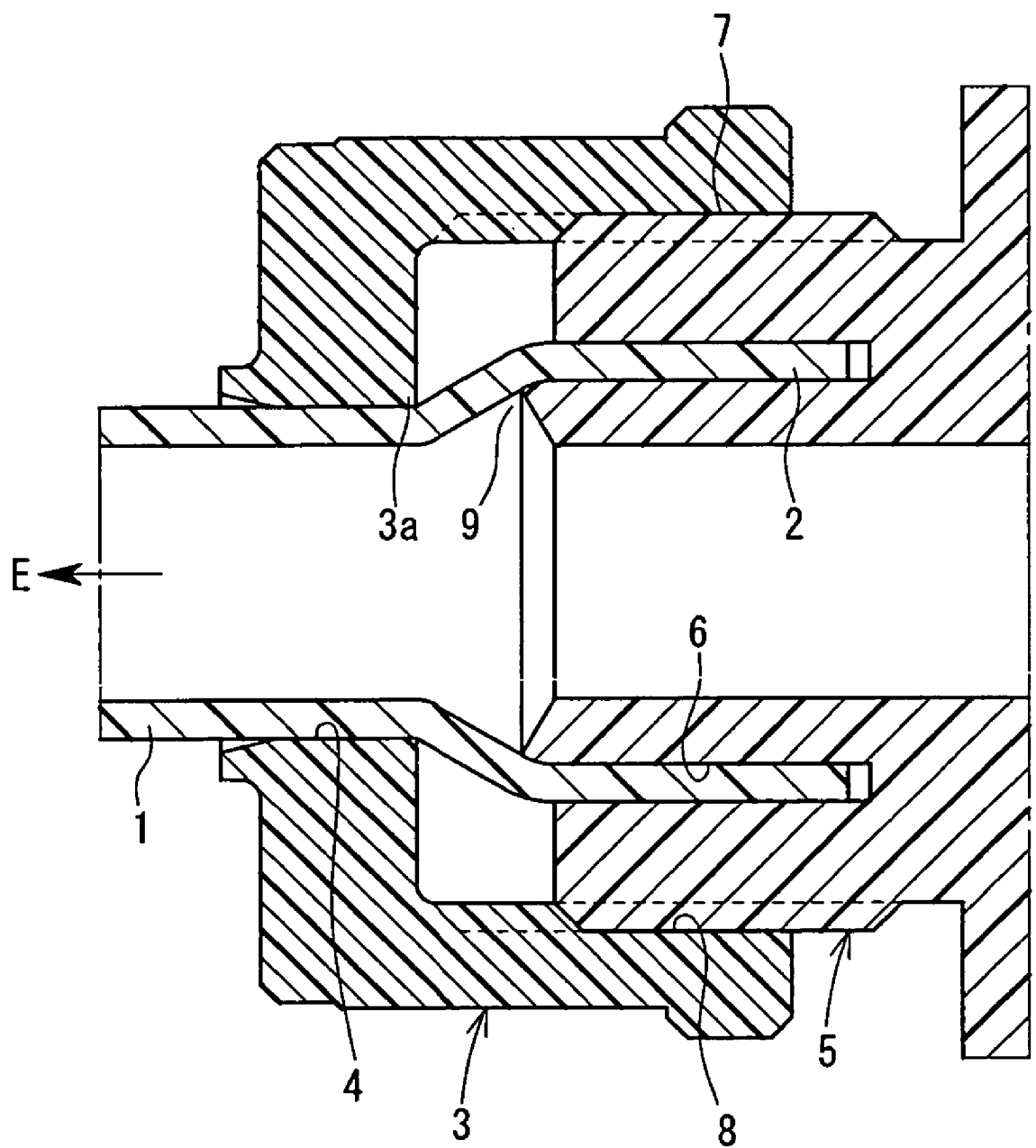
FIG. 9 is a schematic sectional view illustrating a structure of a conventional tube joint.

That is, in the conventional tube joint shown in FIG. 9, the inner circumferential surface at one end of the main joint body 5 is chamfered to fit the tube 1. Thus, the large dead space 9 is formed by the inner wall surface of the diametrally expanded section of the tube 1 and the inner circumferential surface at one end of the main joint body 5. The liquid pool of the pressure fluid flowing through the tube 1 is likely to be formed. In contrast, in the embodiment of the present invention, as shown in FIG. 4, the chamfered section 34 has the curved cross section having the predetermined radius of curvature to minimize a dead space 35. Thus, it is possible to greatly suppress the probability of the formation of the liquid pool as compared with the conventional technique.

Figure 3:
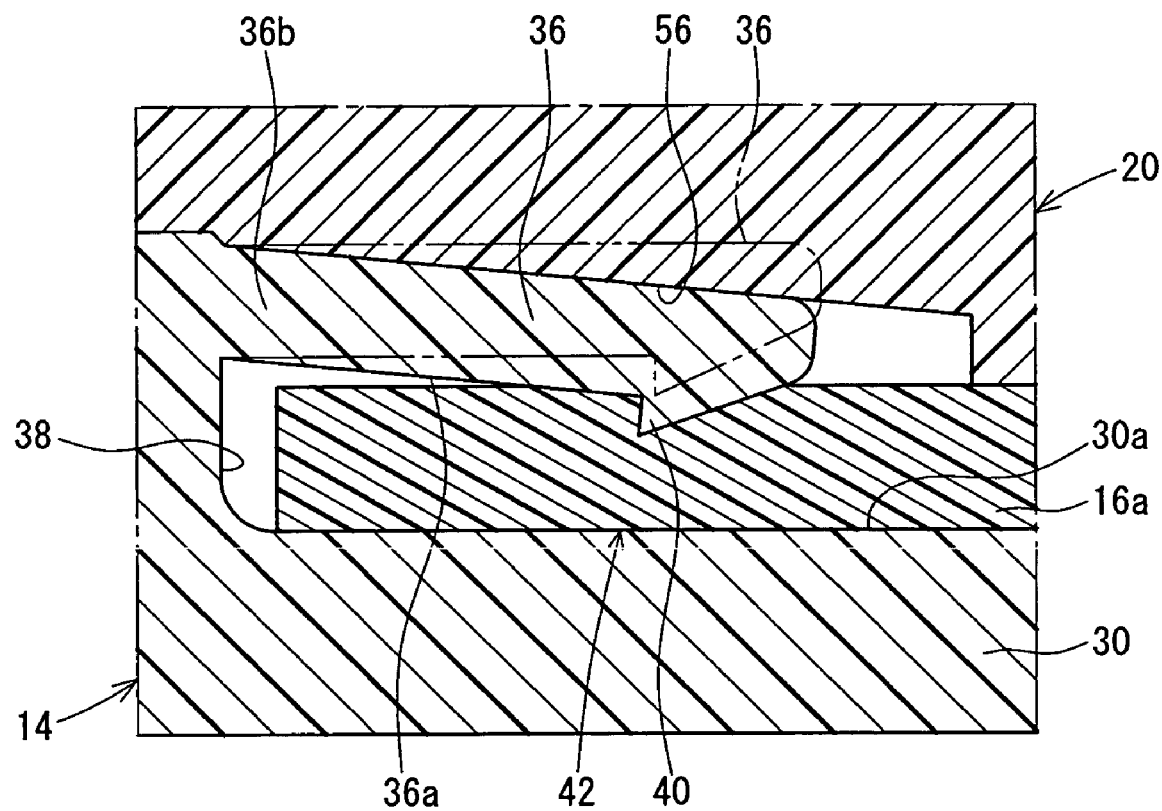
FIG. 3 is a magnified longitudinal sectional view illustrating a portion A of the tube joint shown in FIG. 2.

A plurality of collet sections (fastening mechanism) 36 are provided outwardly around the cylindrical section 30 (see FIG. 1). The collet sections are segmented circumferentially at equal distances around the cylindrical section 30. As shown in FIG. 3, an annular groove 38 is formed between the inner circumferential surfaces 36a of the collet sections 36 and the outer circumferential surface 30a of the cylindrical section 30. The diametrally expanded section 16a of the tube 16 is fitted into the annular groove 38. A fastening pawl 40 with an acute angular cross section is formed at one end of each of the collet sections 36, and protrudes toward the cylindrical section 30. The fastening pawl 40 bites into the outer circumferential surface of the tube 16 inserted along the annular groove 38 for fastening the tube 16. The fastening pawl 40 of the collet section 36 is elastically deformable toward the cylindrical section 30 (radially inwardly) about the support point of a joined section 36b of the collet section 36 with respect to the joint body 14.

Therefore, the fastening pawls 40 of the collet sections 36 are pressed radially inwardly by a pressing section 56 of the nut member 20 as described later on, and the fastening pawls 40 of the collet sections 36 bite into the outer circumferential surface of the tube 16. As a result, the outer circumferential surface 30a of the cylindrical section 30 is closely contact with the inner circumferential surface of the tube 16 corresponding to the outer circumferential surface into which the fastening pawls 40 of the collet sections 36 bite. Thus, a first seal section 42 is formed between the inner circumferential surface of the tube 16 and the outer circumferential surface 30a of the cylindrical section 30 (see FIG. 3), which is substantially parallel to the axis of the joint body 14.

As shown in FIG. 2, a female screw section (second screw section) 44 is formed on the inner circumferential surface of the nut member 20, and is screwed with the first male screw section 22a of the joint body 14. An annular protrusion 46 is formed on the outer side in the vicinity of the plug hole 18 of the nut member 20. The protrusion 46 protects the tube 16 against any breakage of the tube 16 protruding from the plug hole 18.

As shown in FIG. 4, annular fastening sections (edge sections) 48a, 48b having acute angular cross sections are formed on the inner side in the vicinity of the plug hole 18 of the nut member 20. When the nut member 20 is screwed into the joint body 14, the annular fastening sections 48a, 48b engage with the inclined outer circumferential surface of the tube 16 so that the tube 16 is pressed toward the tapered surface 32 of the joint body 14.

Therefore, when the screwing amount of the nut member 20 on the joint body 14 is increased, the tube 16 is interposed between the tapered surface 32 of the cylindrical section 30 of the joint body 14 and the annular fastening sections 48*a*, 48*b* of the nut member 20. As a result, the tapered surface 32 of the cylindrical section 30 tightly contacts the inclined inner wall surface of the tube 16 pressed by the annular fastening sections 48*a*, 48*b*. A second seal section 50 is formed between the tapered surface 32 of the cylindrical section 30 and the inclined inner wall surface of the tube 16 (see FIG. 4), which intersects the axis of the joint body 14.

As shown in FIG. 4, an annular holding portion 54 is formed on the inner circumferential surface of the nut member 20 disposed closely to the annular fastening sections 48*a*, 48*b*. The annular holding portion 54 has a substantially rectangular cross section, and extends via a recess 52 having a circular arc-shaped cross section. The annular holding portion 54 functions as a retainer contacting the outer circumferential surface of the tube 16 so that the tube 16 does not come out from the annular groove 38 when the diametrally expanded section 16*a* of the tube 16 is inserted into the annular groove 38 of the joint body 14.

As shown in FIG. 2, the pressing section 56 is formed on the inner circumferential surface of the nut member 20 between the annular holding portion 54 and the female screw section 44. The pressing section 56 has a tapered surface of gradually decreasing inner diameters from the female screw section 44. When the female screw section 44 of the nut member 20 is screwed into the first male screw section 22*a* of the joint body 14, one end of each of the collet sections 36 of the joint body 14 is engaged with the pressing section 56, and the collet sections 36 are pressed radially inwardly. Therefore, one end of each of the collet sections 36 is tightened radially inwardly when the pressing section 56 of the nut member 20 presses the collet sections 36. The fastening pawls 40 of the collet sections 36 bite into the outer circumferential surface of the tube 16 (see FIG. 3).

Figure 5:
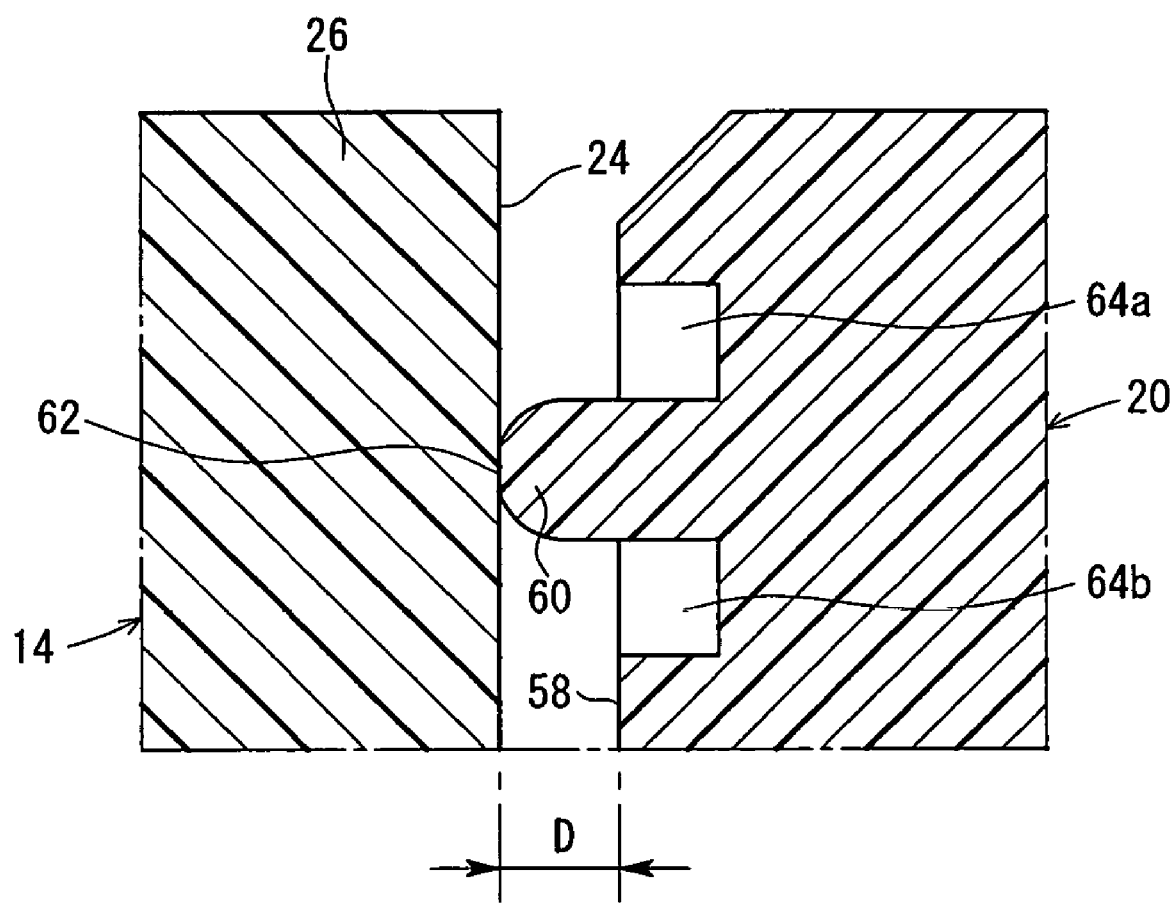
FIG. 5 is a magnified longitudinal sectional view illustrating a portion C of the tube joint shown in FIG. 2.

An annular projection (regulating element) 60 is integrally formed on an end surface 58 of the nut member 20 in the vicinity of the female screw section 44, which regulates the screwing amount of the female screw section 44 of the nut member 20 on the first male screw section 22*a* of the joint body 14. As shown in FIG. 5, the annular projection 60 has an abutment surface 62 to abut against the annular step 24 of the joint body 14. The abutment surface 62 has a circular arc-shaped cross section. The annular projection 60 has a thin-walled annular shape protruding by a predetermined length from the end surface 58 of the nut member 20 toward the annular step 24 of the joint body 14.

Figure 6:
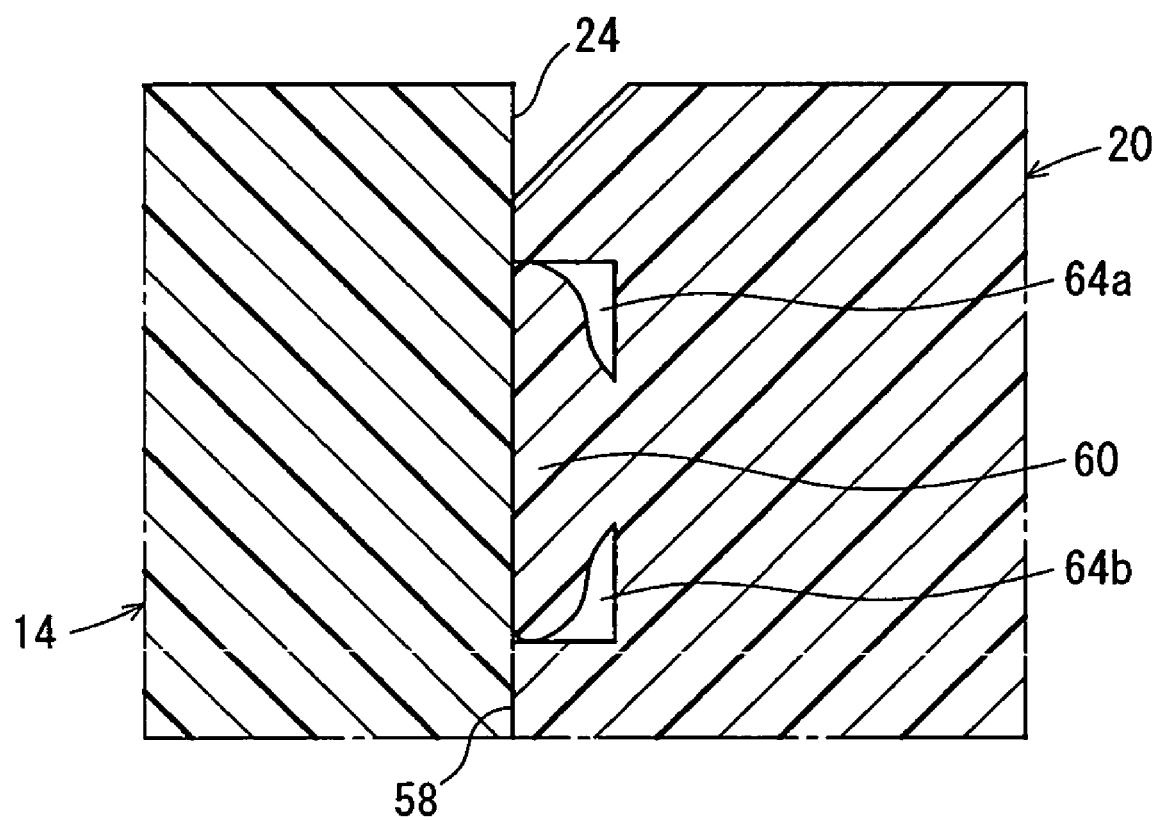
FIG. 6 is a magnified longitudinal sectional view showing that a nut member is further screwed from the state shown in FIG. 5 and an annular projection is plastically deformed.

A first annular recess 64*a* and a second annular recess 64*b* are formed on the end surface 58 of the nut member 20. The first annular recess 64*a* is disposed radially outwardly compared with the annular projection 60. The second annular recess 64*b* is formed radially inwardly compared with the annular projection 60. As shown in FIG. 6, the first annular recess 64*a* and the second annular recess 64*b* can receive the annular projection 60 when the annular projection 60 deforms plastically on contact with the annular step 24.

The tube joint 10 according to the embodiment of the present invention is basically constructed as described above. Next, its function and effect will be explained.

At first, the tube 16 is inserted along the plug hole 18 of the nut member 20. After that, one end of the tube 16 is diametrally expanded to the predetermined diameter by using an unillustrated jig to form the diametrally expanded section 16*a*.

Subsequently, the diametrally expanded section 16*a* of the tube 16 is inserted along the annular groove 38 formed between the collet sections 36 and the cylindrical section 30 of the joint body 14. In this embodiment, the end surface of the diametrally expanded section 16*a* of the tube 16 inserted along the annular groove 38 does not have to arrive at the deepest portion of the annular groove 38. The sealing performance is not affected even when any gap is formed between the end surface of the diametrally expanded section 16*a* of the tube 16 and the inner wall surface of the annular groove 38 (see FIG. 2).

Subsequently, the female screw section 44 of the nut member 20, which is previously fitted loosely to the tube 16 through the plug hole 18, is screwed along the first male screw section 22*a* of the joint body 14 to tighten the nut member 20. Accordingly, the tube 16 is retained by the nut member 20.

When the nut member 20 is tightened to gradually increase the screwing amount of the female screw section 44 on the first male screw section 22*a* of the joint body 14, the pressing section 56 on the inner wall surface of the nut member 20 becomes in contact with the collet sections 36, and the plurality of collet sections 36 are pressed radially inwardly by the tapered surface having diameters gradually reduced from the female screw section 44. The fastening pawls 40 of the collet sections 36 pressed radially inwardly bite into the outer circumferential surface of the diametrally expanded section 16*a* of the tube 16, and thus the tube 16 is fastened (see FIG. 3).

Therefore, for example, even when the force to pull out the tube 16 in the direction opposite to the direction of insertion of the tube 16 is exerted, it is possible to reliably avoid the disengagement of the tube 16 from the joint body 14, because the tube 16 is fastened by the fastening pawls 40 of the collet sections 36.

When the screwing amount of the female screw section 44 of the nut member 20 is increased on the first male screw section 22*a* of the joint body 14, one end of the annular projection 60 protruding by the predetermined length from the end surface 58 of the nut member 20 near the female screw section 44 abuts against the annular step 24 of the joint body 14, and the screwing amount is regulated (see FIG. 5). Therefore, the operator can visually and easily recognize that the annular projection 60 of the nut member 20 abuts against the annular step 24 of the joint body 14. An appropriate screwing amount is established by confirming the abutment of the annular projection 60 against the annular step 24.

In other words, the protruding amount of the annular projection 60 from the end surface 58 of the nut member 20 is previously set so that the screwing amount between the first male screw section 22*a* and the female screw section 44 is appropriate when the annular projection 60 of the nut member 20 abuts against the annular step 24 of the joint body 14.

The appropriate screwing amount of the nut member 20 is retained with respect to the joint body 14 as described above. Accordingly, it is possible to avoid any excessive biting of the fastening pawls 40 of the collet sections 36 and the annular fastening sections 48*a*, 48*b* into the outer circumferential surface of the tube 16. Also, it is possible to reliably prevent the tube 16 from disengagement from the joint body 14.

When the nut member 20 is loosened so that the screwing amount of the female screw section 44 of the nut member 20 is decreased with respect to the first male screw section 22a of the joint body 14, the collet sections 36 are released from being pressed radially inwardly. Therefore, the collet sections 36 are restored to the initial shapes owing to the resilient force (see two-dot chain lines in FIG. 3) to release the diametrally expanded section 16a of the tube 16 from the biting of the fastening pawls 40. The diametrally expanded section 16a of the tube 16 can be pulled out easily from the annular groove 38 of the joint body 14.

Even when the tightening torque is decreased due to long-time use and the nut member 20 is loosened with respect to the joint body 14, the operator can tighten the nut member 20 along the first male screw section 22a so that the nut member 20 is further tightened until the annular projection 60 abuts against the annular step 24 of the joint body 14 to cause the plastic deformation. The annular projection 60 abutted against the annular step 24 is plastically deformed along the adjoining first and second annular recesses 64a, 64b without protruding from the end surface 58 of the nut member 20. The nut member 20 can be tightened until the annular step 24 of the joint body 14 abuts against the end surface 58 of the nut member 20 (see FIG. 6).

Therefore, even when the nut member 20 is loosened due to the long time use, the tightening amount of the nut member 20 can be added as compared with the conventional technique by the length of the protrusion of the annular projection 60 from the end surface 58 of the nut member 20, i.e., by the distance D between the annular step 24 and the end surface 58 as shown in FIG. 5. Therefore, the tightening force of the nut member 20 is reliably retained for the joint body 14. It is possible to obtain the stable sealing force.

Further, when the nut member 20 is screwed on the joint body 14, the tube 16 is pressed by the annular fastening sections 48a, 48b and the pressing section 56 of the nut member 20 to constitute the first seal section 42 and the second seal section 50. The stable sealing function is achieved by the combination of the first seal section 42 and the second seal section 50.

That is, the collet sections 36 are pressed radially inwardly by the pressing section 56 of the nut member 20 to make the outer circumferential surface 30a of the cylindrical section 30 tightly contact the inner circumferential surface of the tube 16 corresponding to the outer circumferential surface into which the fastening pawls 40 of the collet sections 36 bite. The first seal section 42 is formed between the inner circumferential surface of the tube 16 and the outer circumferential surface 30a of the cylindrical section 30 (see FIG. 3), which is substantially parallel to the axis of the joint body 14. On the other hand, the tapered surface 32 of the cylindrical section 30 of the joint body 14 tightly contacts the inclined inner wall surface of the tube 16 pressed by the annular fastening sections 48a, 48b of the nut member 20. The second seal section 50 is formed between the tapered surface 32 of the cylindrical section 30 and the inclined inner wall surface of the tube 16 (see FIG. 4), which intersects the axis of the joint body 14.

Figure 7:
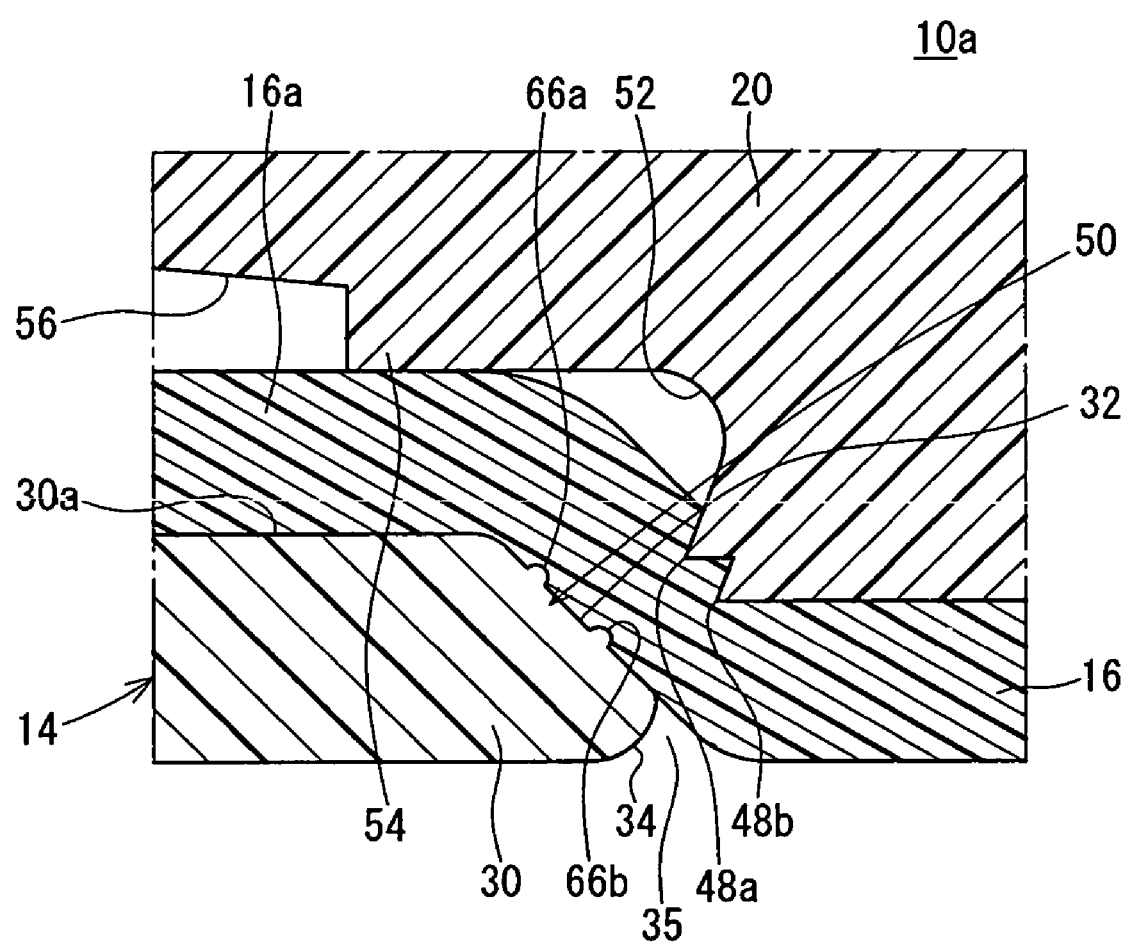
FIG. 7 is a magnified longitudinal sectional view illustrating a tube joint according to another embodiment of the present invention, in which projections are formed on a tapered surface of a cylindrical section of a joint body.
Figure 8:
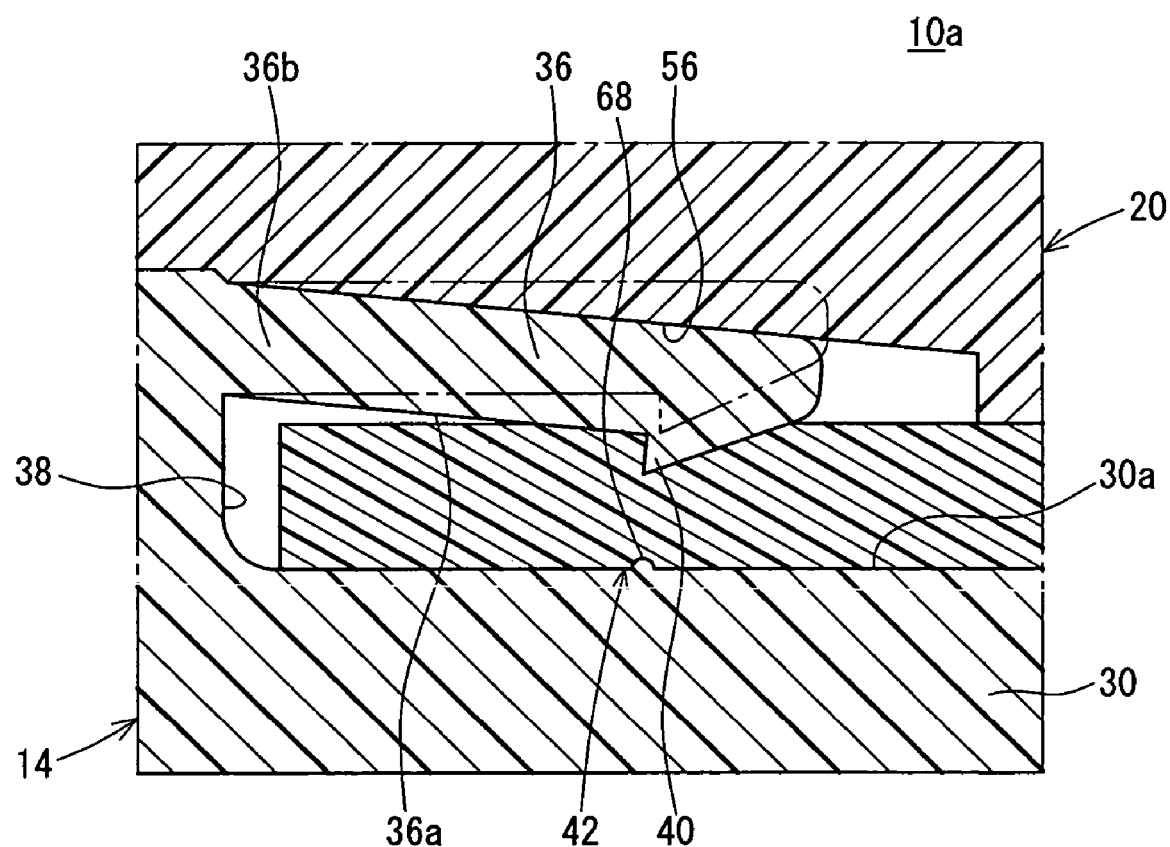
FIG. 8 is a magnified longitudinal sectional view illustrating the tube joint according to the another embodiment of the present invention, in which a projection is formed on an outer circumferential surface of the cylindrical section of the joint body.

Next, a tube joint 10a according to another embodiment of the present invention is shown in FIGS. 7 and 8. The constituent elements that are the same as those of the tube joint 10 shown in FIGS. 3 and 4 are designated by the same reference numerals, and detailed explanation thereof will be omitted.

As shown in FIG. 7, the tube joint 10a according to the other embodiment has a plurality of annular or circular projections 66a, 66b formed circumferentially on the tapered surface 32 of the cylindrical section 30 of the joint body 14. The projections 66a, 66b are spaced from each other by a predetermined distance and correspond to the annular fastening sections 48a, 48b of the nut member 20. As shown in FIG. 8, the tube joint 10a has an annular or circular projection 68 which is formed on the outer circumferential surface 30a of the cylindrical section 30 corresponding to the fastening pawls 40 of the collet sections 36.

In the tube joint 10a as described above, the single or the plurality of the projections 66a, 66b, 68 having substantially semicircular cross sections are formed on the tapered surface 32 and the outer circumferential surface 30a of the cylindrical section 30 of the first seal section 42 and the second seal section 50. Accordingly, it is possible to increase the surface pressure of the sealing surface. Further, the frictional force is increased between the projections 66a, 66b, 68 and the inner wall surface of the diametrally expanded section 16a of the tube 16. Thus, the tube 16 is prevented from any slippage.

The other function and effect are the same as those of the tube joint 10 described above, any detailed explanation of which is omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A tube joint comprising:
a joint body which has a through-hole as a fluid passage formed in an axial direction and which has a first screw section formed at least at one end;
a nut member which connects a tube member to said joint body, said nut member being fitted to said one end of said joint body by a second screw section that is screwed with said first screw section;
a fastening mechanism which is provided at said one end of said joint body and which is pressed radially inwardly by an inner wall surface of said nut member for engaging with a diametrally-expanded outer circumferential surface of said tube member; and
a regulating element which is provided on an end surface of said nut member to be screwed on said joint body and which regulates a screwing amount of said nut member on said joint body,
wherein said regulating element comprises an annular projection having a continuous annular shape that protrudes a predetermined length from said end surface of said nut member toward said joint body, and said screwing amount of said nut member is regulated by abutment of a continuous annular end surface of said annular projection against an annular step of said joint body, said annular projection being plastically deformable so that said nut member is capable of being further screwed after said continuous annular end surface of said annular projection abuts against said annular step of said joint body through compression and deformation of said annular projection.

2. The tube joint according to claim 1, wherein said fastening mechanism includes a plurality of collet sections which are elastically deformable toward an outer circumference of said tube member inserted into said joint body and which are segmented in a circumferential direction to surround said outer circumferential surface of said tube member, and fastening pawls which are formed on said collet sections and which bite into said outer circumferential surface of said tube member.

3. The tube joint according to claim 2, wherein a pressing section is provided on said inner wall surface of said nut member, said pressing section comprises a tapered surface having gradually decreasing inner diameters from said second screw section, and said collet sections are pressed by said pressing section radially inwardly when said nut member is screwed.

4. The tube joint according to claim 1, wherein said end surface of said nut member is formed with an annular recess for receiving said annular projection, which is deformed when said nut member is further screwed toward said joint body after said annular projection abuts against said annular step of said joint body.

5. The tube joint according to claim 1, wherein said nut member is formed with a plug hole for inserting said tube member thereinto, and an edge section is provided on said inner wall surface of said nut member in the vicinity of an end of said plug hole, said edge section bites into said outer circumferential surface of said tube member.

6. The tube joint according to claim 5, wherein a tapered surface is formed at said end of said joint body, said tapered surface is diametrally expanded gradually in a direction in which said tube member is inserted, and a projection is formed circumferentially on said tapered surface, corresponding to said edge section of said nut member.

7. The tube joint according to claim 2, wherein a projection is formed circumferentially corresponding to said fastening pawls formed on said collet sections, said projection is provided on an outer circumferential surface at an end of said joint body.

8. The tube joint according to claim 1, wherein each of said joint body and said nut member is formed of a resin material.

9. The tube joint according to claim 1, wherein a cylindrical section is formed at said end of said joint body, a diametrally expanded section of said tube member is attached to said cylindrical section, a chamfered section is formed at an end of cylindrical section, said chamfered section faces a through-hole.

* * * * *